May 11, 1926. Re. 16,348

W. J. CARPENTER

SWAB

Original Filed Jan. 24, 1923 2 Sheets-Sheet 1

Inventor:
WILLIAM JAMES CARPENTER,

Fad W Lamie
Atty.

May 11, 1926. Re. 16,348

W. J. CARPENTER

SWAB

Original Filed Jan. 24, 1923 2 Sheets-Sheet 2

Inventor:
WILLIAM JAMES CARPENTER,

Fred W. Lanie
Atty.

Reissued May 11, 1926.

Re. 16,348

UNITED STATES PATENT OFFICE.

WILLIAM JAMES CARPENTER, OF EASTLAND, TEXAS, ASSIGNOR, BY MESNE ASSIGNMENTS, TO W. N. HAMAKER, TRUSTEE, OF LOS ANGELES, CALIFORNIA.

SWAB.

Original No. 1,485,248, dated February 26, 1924, Serial No. 614,634, filed January 24, 1923. Application for reissue filed December 21, 1925. Serial No. 76,872.

This invention relates to a swab for use in oil wells and the like, the general object of the invention being to provide means whereby the upward movement of the swab will lift a certain amount of liquid by reason of the expansion of a packing member, said member contracting on the downward stroke to permit the swab to move downwardly without undue friction.

Another object of the invention is to provide means for preventing overloading of the device on its upward stroke.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figure 1:
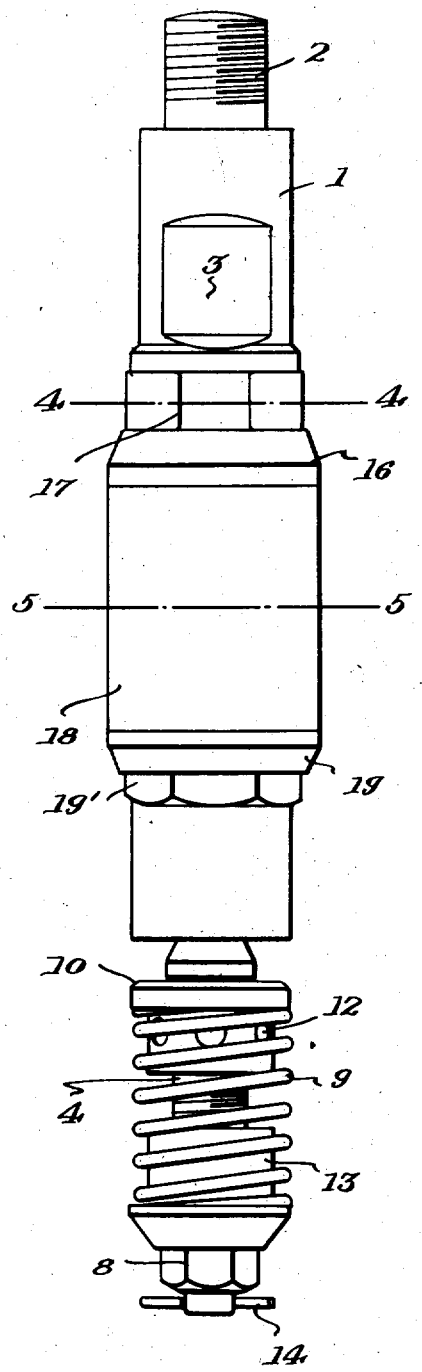
Figure 1 is an elevation of the device.
Figure 2:
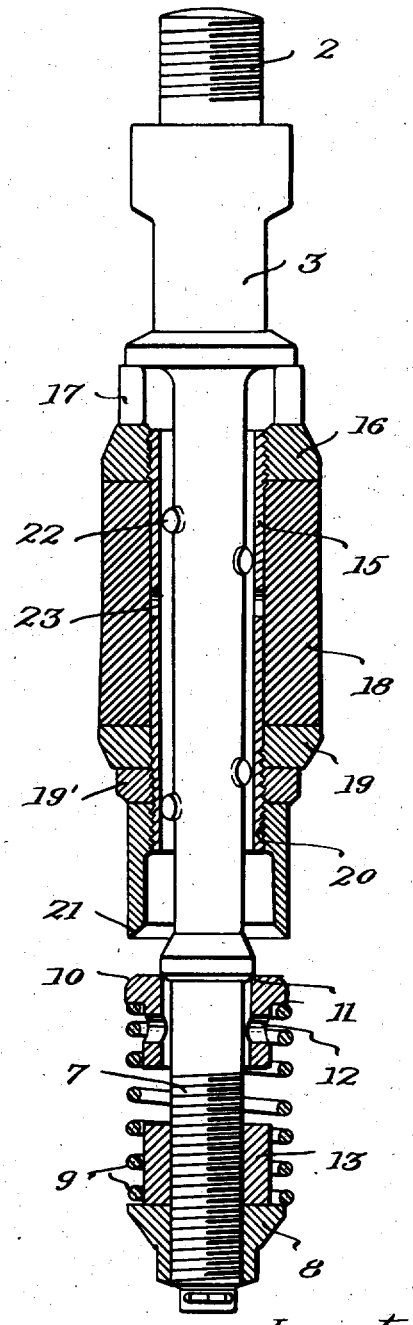
Figure 2 is a longitudinal sectional view thereof showing the parts in one position.

In these views 1 indicates the head of the swab which has a reduced threaded part 2 so that it can be fastened to a tool for permitting it to be placed in a well. The head is provided with the wrench receiving part 3. A stem 4 is connected with the lower part of the head and this stem has a valve 6 formed thereon intermediate its ends and its lower extremities screw threaded, as at 7, for receiving the nut 8 which supports the spring 9 for the valve 10, which is slidable mounted on the stem and which has a valve seat 11 therein for the valve 6. The bore of the valve 10 is of a greater diameter than the stem 4 so as to permit the fluid passing the valve 6 to escape, and in addition holes 12 may be provided to facilitate such escape. The threaded part of the stem also carries a nut 13 which acts as a safety nut to support the parts if the nut 8 should become loose. A pin 14 passes through a hole in the lower part of the stem to prevent the nuts from dropping off the same. A tube 15 surrounds the stem, said tube having a flange 16 at its upper end which is provided with the notches 17 for permitting the fluid to pass upwardly through the tube to pass into the well. A packing sleeve 18 of rubber or the like is held on the upper part of the tube by the washer 19 and 19′, the nut engaging a screw threaded part 20 of the tube. This nut and washer hold the sleeve between the washer and the flange 16. The lower part of the sleeve carries the valve seat 21 for the valve 10. Pins 22 are carried by the stem 4 for centering the tube and the tube has holes 23 therein for permitting some of the fluid to pass through the same into the space between the tube and sleeve so as to expand the sleeve against the walls of the well.

From the above it will be seen that the head 3 constitutes a fixed abutment on the stem 4 and that the valve 10 is in effect a yielding abutment spaced from said fixed abutment. Further, it may be stated that the valve 6 with its valve seat 11 serves as an automatic relief valve for limiting the static load to be elevated by the swab, with the adjusting nut 8 serving as a means by adjustment of which the load to be elevated may be predetermined.

The parts 15 to 21 constitute a tubular packing unit having the expansible member 18 and providing a central fluid passage with its lower end normally closed by a compound valve means comprising the valves 6 and 10, with one valve element thereof adapted to function independently of the other for releasing fluid from said fluid passage.

In practice the swab will have a normal external diameter only slightly less than the internal diameter of the well casing and for this reason, when the swab is lowered through the liquid within the well casing, the liquid will not freely by-pass the swab between the swab and the casing, therefore, the resistance offered by the liquid column to a relatively rapid lowering of the swab will cause the packing unit to ride upwardly on the stem until it contacts with the fixed abutment or head 1 by which the packing unit is thereafter propelled downwardly. This effects an opening of the valve 10 to permit the liquid to by-pass through the packing unit and the openings 17 therein.

In practical field use, the swab will always contact the well casing on one side or the other, and for this reason and also in event of a crooked well, deposits on the casing wall, or slight irregularities of the casing, the swab may at times have to be forcibly driven through the casing by the stem abutment or head 1.

Figure 3:
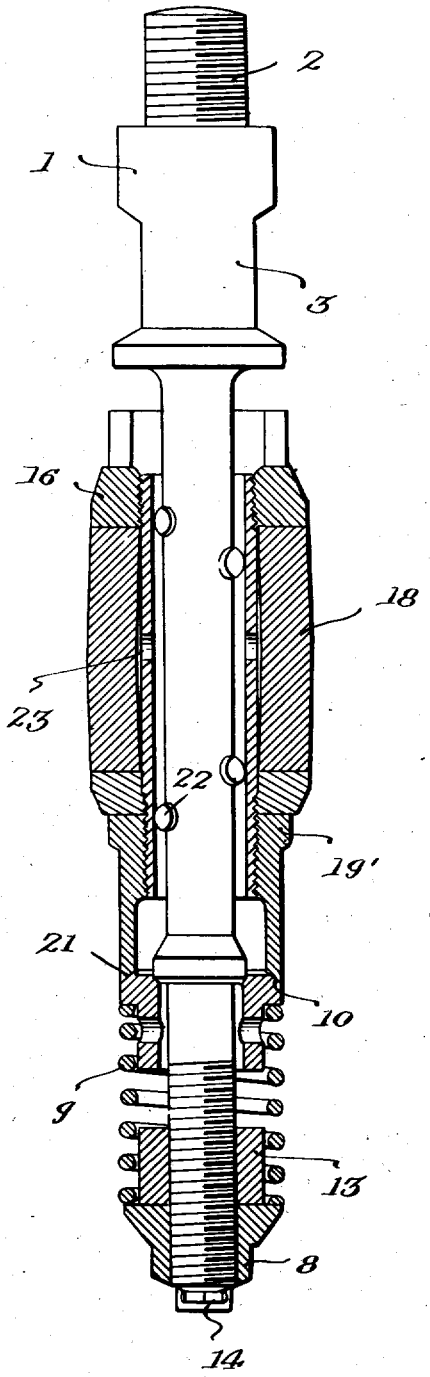
Figure 3 is a similar view showing the parts in another position.
Figure 4:
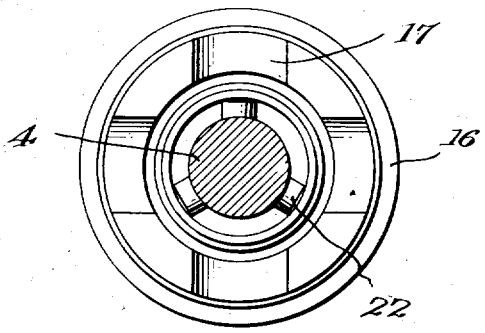
Figure 4 is a section on line 4—4 of Figure 1.
Figure 5:
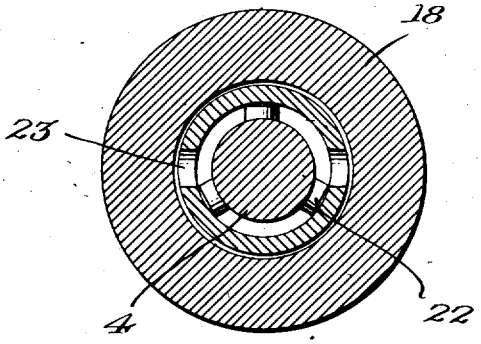
Figure 5 is a section one line 5—5 of Figure 1.
Figure 6:
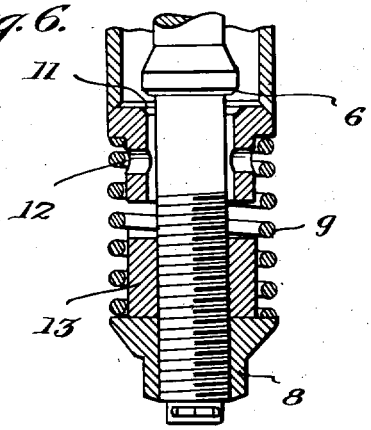
Figure 6 is a section on line 6—6 of Figure 1.

When the swab reaches the point from which it is desired to elevate the liquid contents of the casing, the packing unit will have a tendency to drop by gravity to close the valve 10, as shown in Fig. 3, and this will take place providing the packing unit does not hang up in the casing and providing the swab stem is not elevated before the packing unit has had time to drop. But, if the packing unit does hang up in the casing by reason of any of the causes previously mentioned or if the stem is started upwardly too quickly, the first portion of the upward travel of the stem will effect a closing of the valve 10.

Upon elevation of the closed swab the hydraulic pressure below the swab will be decreased and the packing sleeve will be expanded against the casing wall by the hydraulic load pressure above and within the swab, this being due to the fact that possible escape of the liquid downwardly past the exterior of the swab in relation to the speed of elevation of the swab is insufficient to equalize the pressures.

When the swab has thus been expanded further escape of the liquid past the swab is prevented and a continued upward travel of the swab will effect an elevation of the liquid column above the swab, unless the hydraulic load above the swab is in excess of the capacity of the swab as predetermined by the power of the spring 9, in which event the relief valve 6 will open to permit liquid to escape through the swab until such time in the upward travel of the swab as the load pressure falls within the set capacity of the swab.

It will therefore be understood that an automatic swab of this nature which is preset for a certain maximum load, may safely be lowered to a depth where the load would be greatly in excess of a safe load; for instance, with the swab of the present invention set to elevate the liquid from two thousand foot depth in a certain well, it may safely be lowered in said well to any greater depth because it will not pick up the liquid load until it reaches said two thousand foot level in its upward travel.

It will further be evident that during the elevating travel of the swab it will create a partial vacuum below said swab to draw into the casing additional liquid from the producing strata.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A swab of the class described comprising: a head; a stem connected therewith; a tubular member surrounding the stem; a packing member carried by the tubular member; a valve seat at the lower end of the tubular member; a valve slidably mounted on the stem; a spring carried by the stem for holding the valve upon its seat; and a nut on the stem for adjusting the spring, there being means provided for permitting the packing member to be expanded on the upward stroke by the pressure of the liquid being raised.

2. A swab of the class described comprising: a head; a stem connected therewith; a tubular member surrounding the stem; a packing member carried by the tubular member; a valve seat at the lower end of the tubular member; a valve slidably mounted on the stem; a spring carried by the stem for holding the valve upon its seat; a nut on the stem for adjusting the spring, there being means provided for permitting the packing member to be expanded on the upward stroke by the pressure of the liquid being raised; and a relief valve carried by the stem for permitting any surplus liquid being lifted to escape until the weight of the liquid is equal to the strength of the spring.

3. A swab of the class described comprising: a head; a stem connected therewith; a tubular member surrounding the stem; a packing member carried by the tubular member; a valve seat at the lower end of the tubular member; a valve slidably mounted on the stem; a spring carried by the stem for holding the valve upon its seat; a nut on the stem for adjusting the spring, there being means provided for permitting the packing member to be expanded on the upward stroke by the pressure of the liquid being raised; a relief valve carried by the stem for permitting any surplus liquid being lifted to escape until the weight of the liquid is equal to the strength of the spring; and a safety nut carried by the stem.

4. A swab of the class described, comprising: a stem having an abutment; a tubular packing unit having an expansible packing member and surrounding and spaced from the stem below said abutment to provide a fluid passage open at its upper end, the inner surface of the packing member being exposed to pressure within said fluid passage; a valve means between the stem and the lower end of said unit and adapted to be opened by the stem during its downward travel to permit free flow of fluid through the fluid passage and to be closed during upward travel of the stem to close said fluid passage and permit building up of pressure therein for expanding the packing member; a relief valve operable to permit escape of fluid from the fluid passage while said first named valve means is closed, to diminish the hydraulic load above the swab; and adjustable means for regulating the operation of the relief valve to predetermine the load capacity of the swab.

5. A swab of the class described comprising: a stem having an abutment; a tubular packing unit having an expansible packing member and surrounding and spaced from the stem below said abutment to provide a fluid passage open at its upper end, the inner surface of the packing member being exposed to pressure within said fluid passage; a valve means between the stem and the lower end of said unit and adapted to be opened by the stem during its downward travel to permit free flow of fluid through the fluid passage and to be closed during upward travel of the stem to close said fluid passage and permit building up of pressure therein for expanding the packing member; a relief valve operable to permit escape of fluid from the fluid passage while said first named valve means is closed, to diminish the hydraulic load above the swab; spring means for holding the relief valve closed against the hydraulic load; and adjustable means for regulating said spring to predetermine the load capacity of the swab.

6. A swab of the class described comprising: a stem having an abutment; a tubular packing unit having an expansible packing member and surrounding and spaced from the stem below said abutment to provide a fluid passage open at its upper end, the inner surface of the packing member being exposed to pressure within said fluid passage; a compound valve means associated with the stem and closing the lower end of the fluid passage to permit building up of pressure within said passage on the up stroke of the swab for expanding the packing member, one element of said compound valve means constituting a relief valve operable during the upward travel of the swab to release fluid from the fluid passage to diminish the hydraulic load above the swab; and adjustable means for regulating the operation of the relief valve to predetermine the load capacity of the swab.

7. A swab of the class described comprising: a stem having an abutment; a tubular packing unit having an expansible packing member and surrounding and spaced from the stem below said abutment to provide a fluid passage open at its upper end, the inner surface of the packing member being exposed to pressure within said fluid passage; a compound valve means associated with the stem and closing the lower end of the fluid passage to permit building up of pressure within said passage on the up stroke of the swab for expanding the packing member, one element of said compound valve means constituting a relief valve operable during the upward travel of the swab to release fluid from the fluid passage to diminish the hydraulic load above the swab; spring means for holding the relief valve closed against the hydraulic load; and adjustable means for regulating said spring to predetermine the lad capacity of the swab.

8. A swab of the class described comprising: a stem having an abutment; a tubular packing unit having an expansible packing member and surrounding and spaced from the stem below said abutment to provide a central fluid passage open at its upper end; and yieldable valve means slidably associated with the stem and cooperating with said unit below the packing member to close said fluid passage to permit building up of pressure therein during the up stroke of the swab for expanding the packing member, said valve means being operable by relative downward travel of the stem to open said fluid passage to permit free flow of liquid therethrough during downward travel of the swab.

9. A swab of the class described comprising: a stem having an abutment and a relief valve element spaced therefrom; a tubular packing unit having an expansible packing member and surrounding and spaced from the stem between said abutment and said valve element to provide a central fluid passage, said unit having a valve seat at its lower end; a valve sleeve engaging said valve seat and slidable on the stem below said relief valve and having an enlarged bore to provide a fluid escape passage, the upper edge defining said bore constituting a valve seat for the relief valve; and spring means for maintaining the valves closed, with the strength of the spring means controlling the moment of opening of said relief valve.

10. A swab of the class described comprising: a stem having an abutment and a relief valve element spaced therefrom; a tubular packing unit having an expansible packing member and surrounding and spaced from the stem between said abutment and said valve element to provide a central fluid passage, said unit having a valve seat at its lower end; a valve sleeve engaging said valve seat and slidable on the stem below said relief valve and having an enlarged bore to provide a fluid escape passage, the upper edge defining said bore constituting a valve seat for the relief valve; spring means for maintaining the valves closed, with the strength of the spring means controlling the moment of opening of said relief valve; and means for adjusting said spring means to vary such moment of opening of the relief valve.

In testimony whereof, I have hereunto set my hand at Eastland, Eastland County Texas, this 16th day of September, 1925.

WILLIAM JAMES CARPENTER.